United States Patent
Dryburgh

(10) Patent No.: US 8,091,961 B2
(45) Date of Patent: Jan. 10, 2012

(54) TRANSPORT SEATING

(75) Inventor: Ian Hamilton Dryburgh, Sparsholt (GB)

(73) Assignee: Contour Aerospace Ltd.

( * ) Notice: Subject to any disclaimer, the term of this patent is extended or adjusted under 35 U.S.C. 154(b) by 37 days.

(21) Appl. No.: 12/594,666

(22) PCT Filed: Feb. 11, 2008

(86) PCT No.: PCT/GB2008/000457
§ 371 (c)(1),
(2), (4) Date: Oct. 5, 2009

(87) PCT Pub. No.: WO2009/013445
PCT Pub. Date: Jan. 29, 2009

(65) Prior Publication Data
US 2010/0052382 A1   Mar. 4, 2010

(30) Foreign Application Priority Data
Feb. 22, 2007   (GB) .................................. 0703471.3

(51) Int. Cl.
*A47C 7/62*   (2006.01)

(52) U.S. Cl. ................. 297/184.1; 297/184.11; 297/232; 297/248

(58) Field of Classification Search ............... 297/184.1, 297/184.11, 248, 232
See application file for complete search history.

(56) References Cited

U.S. PATENT DOCUMENTS

| | | | | |
|---|---|---|---|---|
| 1,702,827 | A * | 2/1929 | Gustaveson | 297/244 |
| 5,857,745 | A * | 1/1999 | Matsumiya | 297/184.14 X |
| 6,113,183 | A * | 9/2000 | Koch et al. | 297/184.14 |
| 6,170,786 | B1 * | 1/2001 | Park et al. | 248/274.1 |
| 6,644,736 | B2 * | 11/2003 | Nguyen et al. | 297/184.17 |
| 6,742,842 | B2 * | 6/2004 | Dowty | 297/184.14 X |
| 7,025,306 | B2 * | 4/2006 | Saint Jalmes | 244/118.6 |
| 7,055,904 | B2 * | 6/2006 | Skelly et al. | 297/284.9 |
| 7,111,904 | B2 * | 9/2006 | Dowty et al. | 297/313 |
| 7,131,698 | B2 * | 11/2006 | Dowty et al. | 297/408 |
| 7,134,729 | B2 * | 11/2006 | Dowty et al. | 297/452.18 |
| 7,178,871 | B1 | 2/2007 | Round et al. | |
| 7,568,759 | B2 * | 8/2009 | Schurg | 297/184.1 |

(Continued)

FOREIGN PATENT DOCUMENTS
FR   EP1364874   11/2003
(Continued)

*Primary Examiner* — Rodney B White
(74) *Attorney, Agent, or Firm* — Jennifer Meredith, Esq.; Meredith & Keyhani, PLLC

(57) ABSTRACT

Two rows of seats (11, 12, 13) and (21, 22, 23), each having a seat cushion (2), a backrest (3) and a head rest (4) with wings (5). The outer seats (11, 13; 21, 23) face in one direction whilst the middle seats (12; 22) face in the other direction. The result is that the passenger in the middle seat (22) can look directly along lines of sight S at the passengers in the outer seats (11, 13) of the next row and vice versa, which they would prefer not to be able to do. The lines of sight pass the wings (5) of the head rests in front of the passengers concerned. The wings (5) extend from the edges (6) of their head rests (4) and have (screens 101) pivoted to the outside of the wings at their proximal ends (7). The screens comprise an outer frame (102) and a fabric screen material (103) within the frame. It is this material that interrupts the lines of sight S.

8 Claims, 2 Drawing Sheets

U.S. PATENT DOCUMENTS

Figure 1:
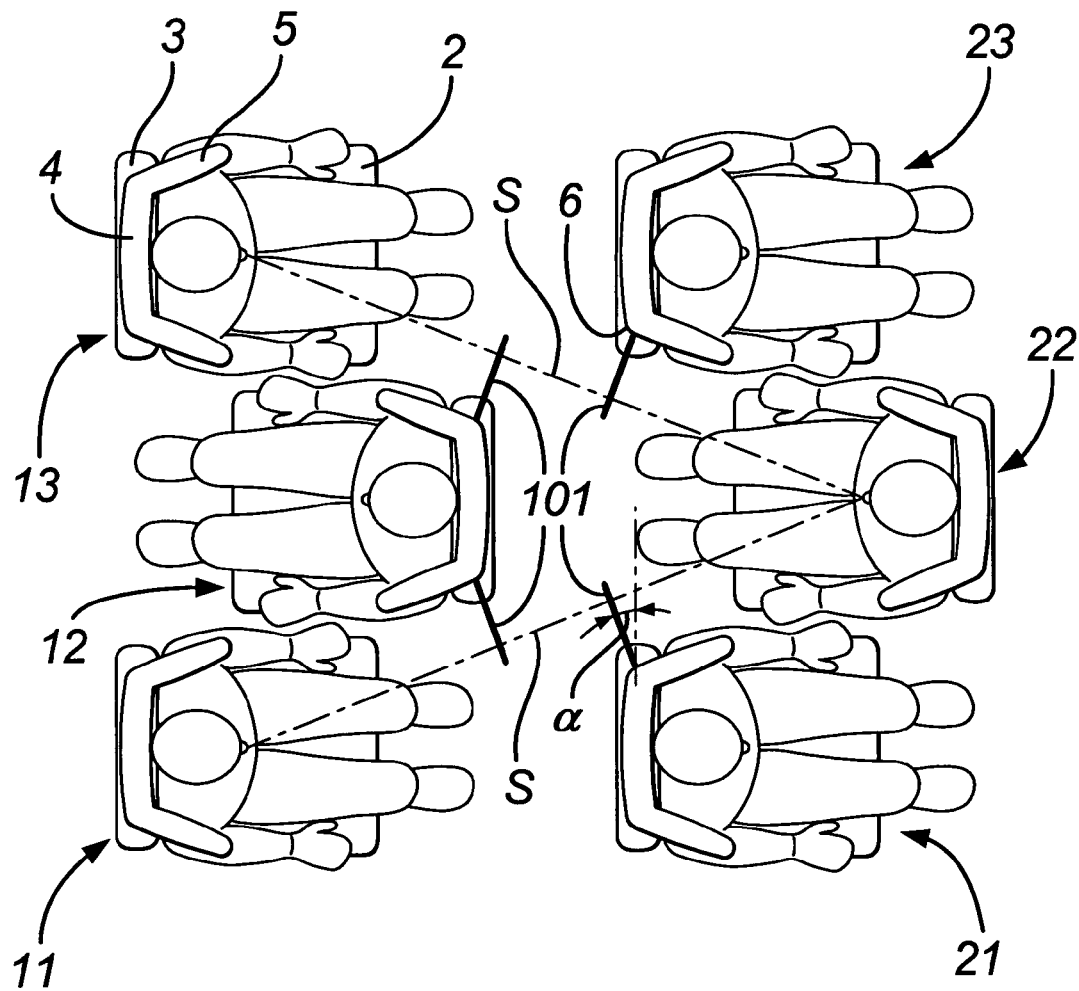

| | | | |
|---|---|---|---|
| 7,641,278 B2 * | 1/2010 | Strasser et al. | 297/184.14 |
| 2003/0085597 A1 * | 5/2003 | Ludeke et al. | 297/184.14 |
| 2005/0127740 A1 * | 6/2005 | Dowty | 297/487 |
| 2008/0224510 A1 * | 9/2008 | Hankinson et al. | 297/248 |

FOREIGN PATENT DOCUMENTS

| | | |
|---|---|---|
| GB | WO 2007003889 | 1/2007 |

* cited by examiner

TRANSPORT SEATING

The present invention relates to transport seating.

Seating in a transport vehicle is a compromise between space which is equivalent to comfort for the passenger and accommodation of the maximum number of passengers in the interest of economy for the transport organization.

Conventionally, seats are arranged in rows. In a row, the tightest lateral pitch of the seats is dictated by passenger shoulder width. This is because passengers sit shoulder to shoulder. In practice, this dictates that the minimum lateral pitch is of the order of 22 inches.

In our International Patent Application No PCT/GB2006/002360, here referred to as "Our Earlier Application" and now published under No WO 2007003889, we have described and claimed (as amended for International Preliminary Examination):

A row of side-by-side transport seats, each seat comprising:
  a seat cushion and
  a seat back, and
the row comprising:
  at least one seat facing in one direction and
  at least one adjacent seat facing in the opposite direction.

As described in Our Earlier Application, in certain embodiments the row of transport seats will include a divider extending or extensible between each pair of adjacent seats at least at head height in the seats.

The divider may be provided simply as a screen extending forwards from one side edge at the top of the back of one seat to the nearest side edge at the top of the back of the adjacent seat. It may be rigid or it may be flexible, preferably it is sufficiently robust to act as a head rest. Whilst the major purpose of the screen is to provide privacy between adjacent passengers, the screen may be drawable to allow conversation.

Alternatively the screen may be a rigid serpentine divider. In this case, at seat cushion level, the divider can have portions on opposite sides of each seat cushion; whilst at shoulder level or at the levels of the tops of the seat backs, the divider is of re-entrant shape, providing greater shoulder width than the inter-digitated seat cushion width.

The greater shoulder width may not extend down as far as elbow level. However, the divider preferably extends down at the wider width to just below the level of arm rests and curves in at this level, whereby it partially overlies the seat cushion of the adjacent seat.

In all these arrangements for the divider, it is purely intended to provide privacy for the passengers in the row of seats having the divider, i.e. to enable one passenger in one seat facing one direction in the row to avoid seeing in the face, or being seen in the face by, another passenger in an adjacent seat facing the other direction in the same row.

The object of the present invention is to provide a privacy screen for a passenger in one seat facing one direction with respect to a passenger facing the other direction in the next row of seats.

According to the invention there is provided a row of side-by-side transport seats, the row comprising:
  at least one seat facing in one direction and
  at least one adjacent seat facing in the opposite direction, and
each seat comprising:
  a seat cushion and
  a seat back,
  a head rest atop the seat back and
  a screen deployable laterally towards the adjacent, oppositely facing seat ("the adjacent seat") from a respective edge of the head rest into the line of sight from the head rest of the adjacent seat towards the position occupied in use by the head rest of another such seat directly behind the seat having the screen and facing in the same direction as the latter seat.

Whilst the screen can be adapted and arranged to slide laterally from its head rest for deployment, in the preferred embodiment, each screen is pivotally attached to its head rest at the edge thereof to extend forwards when not in use and laterally when in use.

Conveniently, each head rest has wings extending forwards in the direction in which the seat is facing from the sides of the head rest, with its screens lying alongside the wings when not in use and extending out from the head rest when in use. Whilst the screen can pivot from the distal end of the wing in the preferred embodiment it pivots from the proximal end.

In the preferred embodiment, the screen extends slightly backwards of the head rest to which it is attached so as to be transverse to the line of sight that it interrupts.

Figure 2:
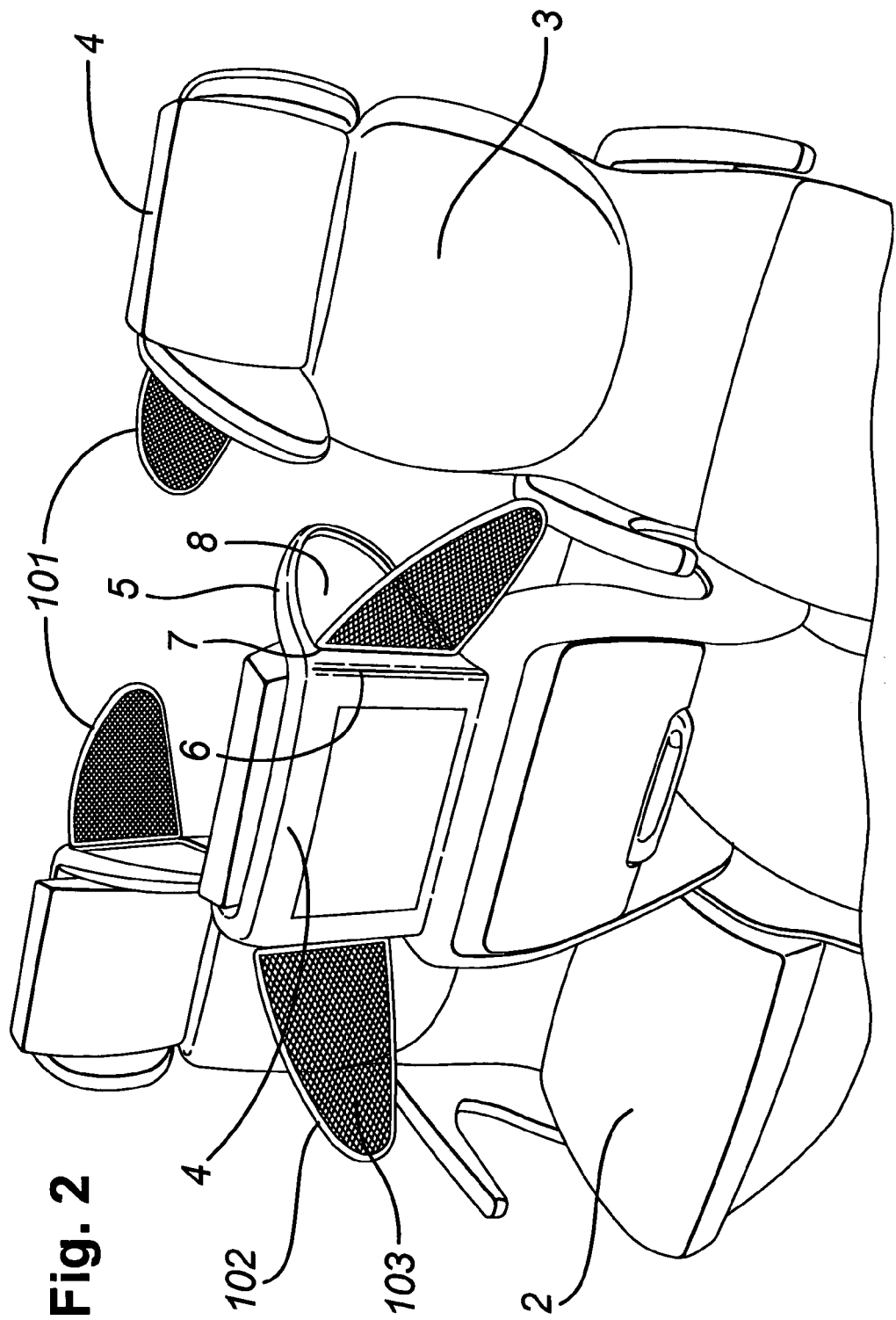

To help understanding of the invention, a specific embodiment thereof will now be described by way of example and with reference to the accompanying drawings, in which:

FIG. 1 is a plan view of six seats in two rows, the seats being arranged in accordance with Our Earlier Application and being fitted with screens in accordance with our present invention and FIG. 2 is a perspective view of one of the rows of seats of FIG. 1.

Referring to FIG. 1 of the drawings, there is shown two rows of seats 11,12,13 and 21,22,23, each having a seat cushion 2, a backrest 3 and a head rest 4 with wings 5. The outer seats 11,13; 21,23 face in one direction whilst the middle seats 12; 22 face in the other direction. The result is that the passenger in the middle seat 22 can look directly along lines of sight S at the passengers in the outer seats 11,13 of the next row and vice versa, which they would prefer not to be able to do. The lines of sight pass the wings 5 of the head rests in front of the passengers concerned.

The wings 5 extend from the edges 6 of their head rests 4 and have screens 101 pivoted to the outside of the wings at their proximal ends 7. The screens comprise an outer frame 102 and a fabric screen material 103 within the frame. It is this material that interrupts the lines of sight S.

The wings have outer surface recesses 8 in which the screens lie when the screens are not deployed. For movement between the recesses and their deployed positions, the screens are provided with pivots and over centre latches, whose details are believed to be within the capabilities of the man skilled in the art.

It will be noted that the screens are angled back a with respect to the head rest supporting them, so as to intercept the lines of sight at approximately right angles. It will be noted that whilst individually the screens 101 intercept the lines of sight S, improved privacy is achieved if both screens on each line of sight are deployed, that is to say the screen(s) on the seat back immediately in front of the passenger concerned and on the seat back of the adjoining seat(s) in the row where the passenger is seated.

The invention claimed is:

1. A row of side-by-side transport seats, the row comprising:
  at least one seat facing in one direction and
  at least one adjacent seat facing in the opposite direction, and each seat comprising:
  a seat cushion, a seat back, a head rest atop the seat back and a screen deployable laterally towards the adjacent, oppositely facing seat from a respective edge of the head rest into the line of sight from the head rest of the adjacent seat towards a position occupied in use by the head rest of another seat directly behind the seat having the screen and facing in the same direction as the seat having the screen.

2. A row of transport seats according to claim 1, wherein each screen is adapted and arranged to slide laterally from its head rest for deployment.

3. A row of transport seats according to in claim 1, wherein each screen is pivotally attached to its head rest at the edge thereof to extend forwards when not in use and laterally when in use.

4. A row of transport seats according to in claim 3, wherein each head rest has wings extending forwards in the direction in which the seat is facing from the sides of the head rest, with its screens lying alongside the wings when not in use and extending out from the head rest when in use.

5. A row of transport seats according to in claim 4, wherein each screen is pivotally connected to the distal end of its wing.

6. A row of transport seats according to in claim 4, wherein each screen is pivotally connected to the proximal end of its wing.

7. A row of transport seats according to claim 4, wherein the wings have recesses, in which the screens lie when not deployed.

8. A row of transport seats according to claim 1, wherein each screen extends slightly backwards of its head rest so as to be transverse to the line of sight that it interrupts.

* * * * *